(12) United States Patent
Kim et al.

(10) Patent No.: US 11,600,860 B2
(45) Date of Patent: Mar. 7, 2023

(54) LITHIUM SECONDARY BATTERY HAVING IMPROVED LOW-TEMPERATURE CHARACTERISTICS AND HIGH-TEMPERATURE CHARACTERISTICS

(71) Applicant: LG Chem, Ltd., Seoul (KR)

(72) Inventors: Gwang Yeon Kim, Daejeon (KR); Jeong Woo Oh, Daejeon (KR); Chui Haeng Lee, Daejeon (KR); Kyoung Ho Ahn, Daejeon (KR); Won Kyung Shin, Daejeon (KR)

(73) Assignee: LG Energy Solution, Ltd.

( * ) Notice: Subject to any disclaimer, the term of this patent is extended or adjusted under 35 U.S.C. 154(b) by 282 days.

(21) Appl. No.: 16/767,424

(22) PCT Filed: Jun. 7, 2019

(86) PCT No.: PCT/KR2019/006889
§ 371 (c)(1),
(2) Date: May 27, 2020

(87) PCT Pub. No.: WO2019/235883
PCT Pub. Date: Dec. 12, 2019

(65) Prior Publication Data
US 2020/0388877 A1 Dec. 10, 2020

(30) Foreign Application Priority Data

Jun. 7, 2018 (KR) .................. 10-2018-0065518
Jun. 5, 2019 (KR) .................. 10-2019-0066923

(51) Int. Cl.
*H01M 10/0567* (2010.01)
*H01M 10/0525* (2010.01)
(Continued)

(52) U.S. Cl.
CPC ... *H01M 10/0567* (2013.01); *H01M 10/0525* (2013.01); *H01M 10/0568* (2013.01);
(Continued)

(58) Field of Classification Search
CPC .......... H01M 10/0567–0569; H01M 10/0525; H01M 10/42; H01M 10/4235
See application file for complete search history.

(56) References Cited

U.S. PATENT DOCUMENTS

| 2002/0114993 A1 | 8/2002 | Miyaki et al. |
| 2007/0042274 A1 | 2/2007 | Muraoka et al. |

(Continued)

FOREIGN PATENT DOCUMENTS

| CN | 1174854 A | 3/1998 |
| CN | 104937146 A | 9/2015 |

(Continued)

OTHER PUBLICATIONS

International Search Report from Application No. PCT/KR2019/006889 dated Sep. 18, 2019, 2 pages.
(Continued)

*Primary Examiner* — Karie O'Neill Apicella
(74) *Attorney, Agent, or Firm* — Lerner, David, Littenberg, Krumholz & Mentlik, LLP

(57) ABSTRACT

A lithium secondary battery is disclosed herein. In some embodiment, a lithium secondary battery which includes a positive electrode including a positive electrode material mixture layer, wherein the positive electrode material mixture layer has a loading capacity of 3.7 mAh/cm² to 10 mAh/cm², a negative electrode including a negative electrode material mixture layer, a separator disposed between the positive electrode and the negative electrode, and a non-aqueous electrolyte solution including a lithium salt, an organic solvent, and a compound represented by Formula 1,
(Continued)

the concentration of the lithium salt in the non-aqueous electrolyte solution is 1.5 M to 3 M, the organic solvent is a mixed solvent including a cyclic carbonate-based organic solvent and a linear carbonate-based organic solvent, and the compound represented by Formula 1 is included in an amount of 0.1 wt % to 5 wt % based on a total weight of the non-aqueous electrolyte solution.

11 Claims, 1 Drawing Sheet

(51) Int. Cl.
*H01M 10/0568* (2010.01)
*H01M 10/0569* (2010.01)
*H01M 10/42* (2006.01)

(52) U.S. Cl.
CPC ... *H01M 10/0569* (2013.01); *H01M 10/4235* (2013.01); *H01M 2010/4292* (2013.01); *H01M 2300/0037* (2013.01)

(56) References Cited

U.S. PATENT DOCUMENTS

| | | | | |
|---|---|---|---|---|
| 2009/0142663 | A1* | 6/2009 | Takeuchi | H01M 10/0567 429/188 |
| 2013/0224604 | A1 | 8/2013 | Yu et al. | |
| 2014/0093789 | A1 | 4/2014 | Ahn et al. | |
| 2014/0173889 | A1 | 6/2014 | Johnson et al. | |
| 2014/0174954 | A1 | 6/2014 | Johnson et al. | |
| 2017/0018806 | A1 | 1/2017 | Shin et al. | |
| 2017/0229735 | A1 | 8/2017 | Ahn et al. | |
| 2018/0309161 | A1 | 10/2018 | Kim et al. | |
| 2018/0342767 | A1* | 11/2018 | Ahn | H01M 10/058 |

FOREIGN PATENT DOCUMENTS

| | | |
|---|---|---|
| EP | 0821368 A2 | 1/1998 |
| JP | 2003197264 A | 7/2003 |
| JP | 2003242954 A | 8/2003 |
| JP | 2005276844 A | 10/2005 |
| JP | 2005319459 A | 11/2005 |
| JP | 2007052964 A | 3/2007 |
| JP | 4253853 B2 | 4/2009 |
| JP | 2012241060 A | 12/2012 |
| JP | 2017532742 A | 11/2017 |
| KR | 20010036763 A | 5/2001 |
| KR | 100984134 B1 | 9/2010 |
| KR | 20130098126 A | 9/2013 |
| KR | 20140038774 A | 3/2014 |
| KR | 20170009289 A | 1/2017 |
| KR | 20170101161 A | 9/2017 |
| KR | 20180022247 A | 3/2018 |
| KR | 20180026358 A | 3/2018 |
| KR | 20190017477 A | 2/2019 |
| WO | 2017146555 A1 | 8/2017 |
| WO | 2018044129 A1 | 3/2018 |

OTHER PUBLICATIONS

Wong et al., "Nonflammable perfluoropolyether-based electrolytes for lithium batteries", PNAS, Mar. 2014, vol. 111, No. 9, pp. 3327-3331.

Extended European Search Report including Written Opinion for Application No. 19814254.9 dated Jan. 29, 2021, pp. 1-10.

* cited by examiner

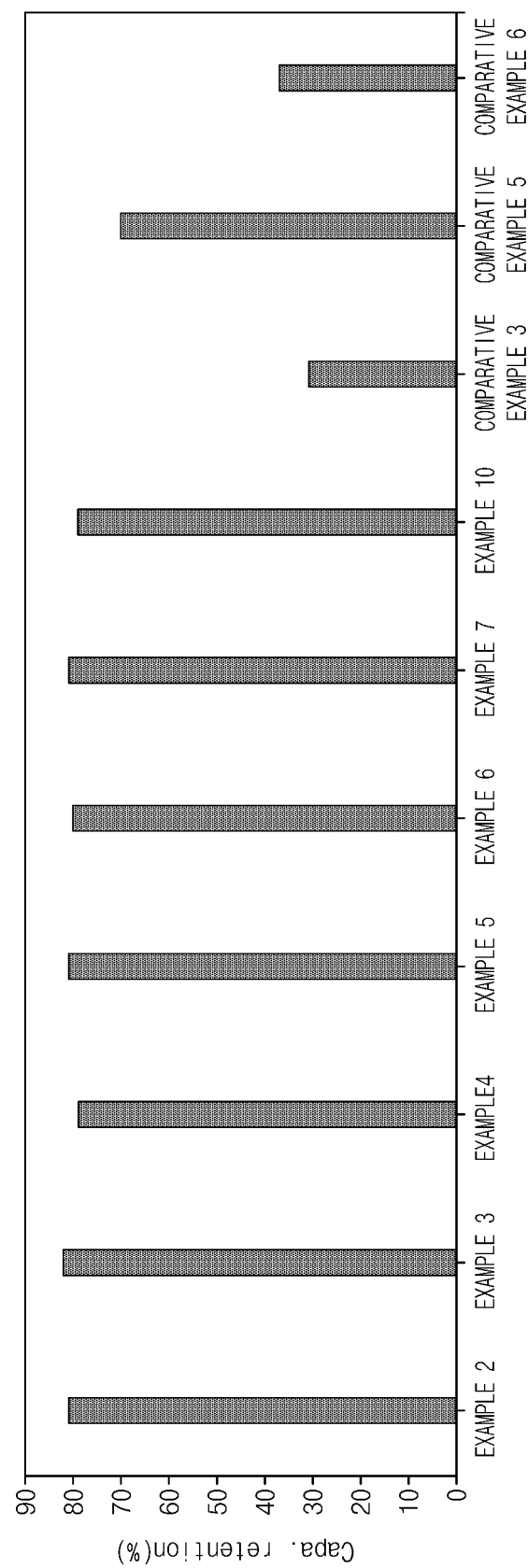

LITHIUM SECONDARY BATTERY HAVING IMPROVED LOW-TEMPERATURE CHARACTERISTICS AND HIGH-TEMPERATURE CHARACTERISTICS

CROSS-REFERENCE TO RELATED APPLICATIONS

The present application is a national phase entry under 35 U.S.C. § 371 of International Application No. PCT/KR2019/006889, filed on Jun. 7, 2019, claims priority from Korean Patent Application Nos. 10-2018-0065518, filed on Jun. 7, 2018, and 10-2019-0066923, filed on Jun. 5, 2019, the disclosures of which are incorporated by reference herein.

Technical Field

The present invention relates to a lithium secondary battery having improved low-temperature resistance characteristics and improved storage characteristics, life characteristics, and capacity characteristics at high temperature.

BACKGROUND ART

There is a need to develop technology for efficiently storing and utilizing electrical energy as personal IT devices and computer networks are developed with the development of information society and the accompanying dependency of society as a whole on the electrical energy is increased.

Among the technologies developed for this purpose, a technology based on secondary batteries is the most suitable technology for various applications. Since a secondary battery may be miniaturized to be applicable to a personal IT device and may be applied to an electric vehicle and a power storage device, there emerges an interest in the secondary battery. Among these secondary battery technologies, lithium ion batteries, which are battery systems having the theoretically highest energy density, are in the spotlight, and are currently being used in various devices.

Unlike the early days when lithium metal was directly used in an electrode, the lithium ion battery has been realized as a system in which a transition metal oxide material containing lithium is used as a positive electrode material, and a carbon-based material, such as graphite, and an alloy-based material, such as silicon, are used as a negative electrode material The lithium ion battery is substantially composed of four materials such as a positive electrode formed of a transition metal oxide containing lithium, a negative electrode capable of storing lithium, an electrolyte solution as a medium for transferring lithium ions, and a separator.

In line with the recent demand for secondary batteries with high capacity/high energy density, there is a need to develop a secondary battery in which life characteristics and capacity characteristics are improved by improving an increase in resistance and a decrease in capacity during storage or charge and discharge at high temperature and preventing electrochemical decomposition at an electrode interface while maximizing energy storage capacity.

PRIOR ART DOCUMENT

Japanese Patent Application Laid-open Publication No. 2005-276844

Japanese Patent Application Laid-open Publication No. 2003-197264

DISCLOSURE OF THE INVENTION

Technical Problem

An aspect of the present invention provides a lithium secondary battery in which low-temperature resistance characteristics are improved and degradation of charge and discharge characteristics at high temperature and life characteristics and capacity characteristics even after high-temperature storage may be prevented by including a positive electrode containing a highly loaded positive electrode material mixture layer and a non-aqueous electrolyte solution containing a high concentration lithium salt.

Technical Solution

According to an aspect of the present invention, there is provided a lithium secondary battery including:

a positive electrode including a positive electrode material mixture layer formed on a positive electrode collector;

a negative electrode including a negative electrode material mixture layer formed on a negative electrode collector;

a separator disposed between the positive electrode and the negative electrode; and a non-aqueous electrolyte solution including a lithium salt, an organic solvent, and a compound represented by Formula 1 as a first additive, wherein the positive electrode material mixture layer has a loading capacity of 3.7 mAh/cm$^2$ to 10 mAh/cm$^2$, the lithium salt has a concentration of 1.5 M to 3 M, the organic solvent is a mixed solvent including a cyclic carbonate-based organic solvent and a linear carbonate-based organic solvent, and the compound represented by Formula 1 is included in an amount of 0.1 wt % to 5 wt % based on a total weight of the non-aqueous electrolyte solution:

[Formula 1]

$$\left(\underset{O}{\overset{}{\diagdown}}\!\!\!\diagup\!\!\!O\!\!-\!\!\underset{(R_b)_{3-c}}{\diagdown}\!\!\!-\!\!O\!\!-\!\!\underset{O}{\overset{}{\diagdown}}\!\!\!-\!\!\underset{H}{\overset{}{N}}\!\!\!-\!\!R_4\!\!-\!\!\underset{H}{\overset{}{N}}\!\!\!-\!\!\underset{O}{\overset{}{\diagdown}}\!\!\!-\!\!O\!\!-\!\![R_1\!\!\frac{}{o}\!\!\!+\!\!R_2\!\!\frac{}{p}\!\!\!+\!\!R_3\!\!\frac{}{r}\!\!\!-\!\!O\!]_q\!\!-\!\!\underset{O}{\overset{}{\diagdown}}\!\!\!-\!\!\underset{H}{\overset{}{N}}\!\!\!-\!\!R_4\!\!-\!\!\underset{H}{\overset{}{N}}\!\!\!-\!\!\underset{O}{\overset{}{\diagdown}}\!\!\!-\!\!O\!\!-\!\!\underset{(R_a)_{3-b}}{\diagdown}\!\!\!-\!\!O\!\!-\!\!\underset{O}{\overset{}{\diagdown}}\!\!\!\diagup\!\!\!\right)_b$$

wherein, in Formula 1,

R$_1$ is an alkylene group having 1 to 5 carbon atoms which is unsubstituted or substituted with fluorine, or —R$_1$'—O—, wherein R$_1$' is an alkylene group having 1 to 5 carbon atoms which is unsubstituted or substituted with fluorine, R$_2$ is an alkylene group having 1 to 3 carbon atoms which is unsubstituted or substituted with fluorine, or —R$_2$'—O—, wherein $R_2'$ is an alkylene group having 1 to 3 carbon atoms which is unsubstituted or substituted with fluorine, $R_3$ is an alkylene group having 1 to 5 carbon atoms which is unsubstituted or substituted with fluorine, $R_4$ is an aliphatic hydrocarbon group or an aromatic hydrocarbon group, $R_a$ and $R_b$ are each independently hydrogen or an alkyl group having 1 to 3 carbon atoms, o, p, q, and r are the numbers of repeating units, o is an integer of 1 to 5, p is an integer of 1 to 10, r is an integer of 1 to 5, q is an integer of 1 to 15, and b and c are each independently an integer of 1 to 3.

In the lithium secondary battery of the present invention, the positive electrode material mixture layer may have a loading capacity of 4 mAh/cm² to 8 mAh/cm², for example, 4 mAh/cm² to 6 mAh/cm².

Also, in the lithium secondary battery of the present invention, the non-aqueous electrolyte solution may include a lithium salt having a concentration of 2 M to 2.5 M.

The organic solvent in the non-aqueous electrolyte solution is a mixed solvent including a cyclic carbonate-based organic solvent and a linear carbonate-based organic solvent, wherein the cyclic carbonate-based organic solvent and the linear carbonate-based organic solvent may be included in a volume ratio of 0.5:9.5 to 2:8.

Furthermore, in the compound represented by Formula 1 as the first additive included in the non-aqueous electrolyte solution, $R_1$ may be —$R_1'$—O—, wherein $R_1'$ is an alkylene group having 1 to 5 carbon atoms which is substituted with fluorine, $R_2$ may be —$R_2'$—O—, wherein $R_2'$ is an alkylene group having 1 to 3 carbon atoms which is substituted with fluorine, and $R_3$ may be an alkylene group having 1 to 3 carbon atoms which is unsubstituted or substituted with fluorine.

Specifically, the compound represented by Formula 1, as the first additive, may be a compound represented by Formula 1a below.

current-constant voltage (CC-CV) condition, stored at 60° C. for 6 weeks, and discharged at a rate of 0.33 C to 2.5 V under a CC condition.

Also, the lithium secondary battery may have a capacity retention of 83% or more which is measured after 150 cycles are performed in which charging at a rate of 0.33 C to 4.25 V under a CC-CV condition at a high temperature (45° C.) and discharging at a rate of 0.1 C to 2.5 V under a CC condition are set as one cycle.

Advantageous Effects

A lithium secondary battery of the present invention may secure high capacity by including a positive electrode containing a highly loaded positive electrode material mixture layer with a loading capacity of 3.7 mAh/cm² or more. Also, the lithium secondary battery of the present invention may improve an effect of the movement of lithium ions and wetting of a non-aqueous electrolyte solution to the electrode by including the non-aqueous electrolyte solution containing a high concentration lithium salt and an acrylate-based compound having a specific structure as an additive, and, since decomposition of a solvent at high temperature and the resulting side reaction may be prevented by reducing an amount of free solvent due to coordination bonds between the organic solvent and Li⁺ in the battery, storage characteristics, life characteristics, and capacity characteristics after storage or charge and discharge at high temperature as well as low-temperature resistance characteristics may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a graph illustrating the results of 2C discharge capacity evaluation of lithium secondary batteries according to Experimental Example 2 of the present invention.

[Formula 1a]

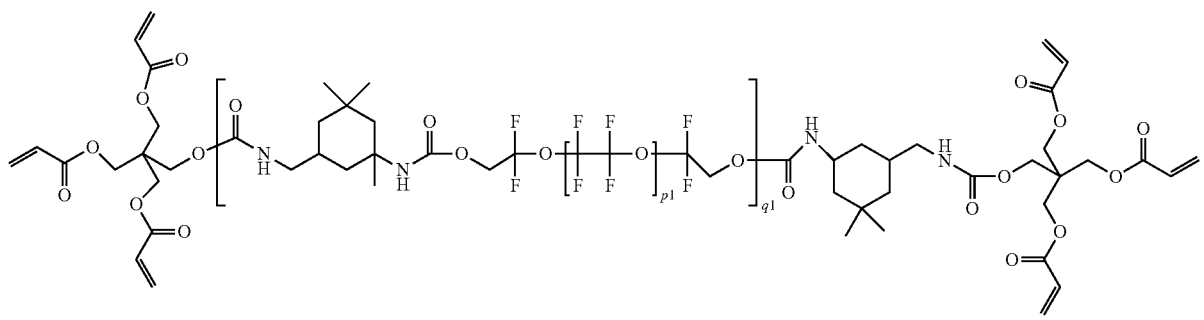

In Formula 1a, p1 and q1 are the numbers of repeating units, p1 is an integer of 1 to 10, and q1 is an integer of 1 to 5.

The first additive may be included in an amount of 0.1 wt % to 3 wt %, for example, 0.1 wt % to 1 wt % based on the total weight of the non-aqueous electrolyte solution.

The lithium secondary battery may have a capacity retention of 82% or more after the lithium secondary battery is charged at a rate of 0.33 C to 4.25 V under a constant

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

For example, in this specification, it will be further understood that the terms "include," "comprise," or "have" specify the presence of stated features, numbers, steps, elements, or combinations thereof, but do not preclude the presence or addition of one or more other features, numbers, steps, elements, or combinations thereof.

Also, the expressions "a" and "b" in the description of "a to b carbon atoms" in the specification each denote the number of carbon atoms included in a specific functional group. That is, the functional group may include "a" to "b" carbon atoms. For example, the expression "alkylene group having 1 to 5 carbon atoms" denotes an alkylene group including 1 to 5 carbon atoms, that is, $-CH_2-$, $-CH_2CH_2-$, $CH_2CH_2CH_2-$, $-CH_2(CH_2)CH-$, $-CH_2CH_2CH_2CH_2CH_2-$, and $-CH(CH_2)CH_2CH_2-$.

Furthermore, in this specification, the expression "alkylene group" denotes a branched or unbranched aliphatic hydrocarbon group or a functional group in the form in which one hydrogen atom is removed from a carbon atom located at both ends of the aliphatic hydrocarbon group. In an embodiment, the alkylene group may be substituted or unsubstituted. The alkylene group may include a methylene group, an ethylene group, a propylene group, an isopropylene group, a butylene group, an isobutylene group, a tert-butylene group, a pentylene group, and a 3-pentylene group, but the alkylene group is not limited thereto, and each of which may be optionally substituted in other embodiments.

Also, unless otherwise defined in the specification, the expression "substitution" denotes that at least one hydrogen bonded to carbon is substituted with another element such as fluorine.

Furthermore, a unit of "loading capacity" in this specification is $mAh/cm^2$.

Loading capacity $(mAh/cm^2)$=[discharge capacity× true density of positive electrode active material]×thickness of positive electrode active material layer  [Equation]

As a result of significant amount of research conducted to improve overall performance after high-temperature storage of a lithium secondary battery, the present inventors have found that, in a case in which a positive electrode containing a highly loaded positive electrode material mixture layer and a non-aqueous electrolyte solution containing a high concentration lithium salt and a specific additive are included, high capacity may be secured, an effect of the movement of lithium ions may be improved, wetting of the non-aqueous electrolyte solution to the electrode may be simultaneously improved, and a performance degradation caused by decomposition of a solvent at high temperature and the resulting side reaction may be improved by reducing an amount of free solvent due to coordination bonds between the solvent and $Li^+$ in the battery, thereby leading to the completion of the present invention.

Lithium Secondary Battery

Hereinafter, a lithium secondary battery according to the present invention will be described in more detail.

The lithium secondary battery according to an embodiment of the present invention includes:

a positive electrode including a positive electrode material mixture layer formed on a positive electrode collector;

a negative electrode including a negative electrode material mixture layer formed on a negative electrode collector;

a separator disposed between the positive electrode and the negative electrode; and a non-aqueous electrolyte solution including a lithium salt, an organic solvent, and a compound represented by the following Formula 1 as a first additive, wherein the positive electrode material mixture layer has a loading capacity of 3.7 $mAh/cm^2$ to 10 $mAh/cm^2$, the lithium salt has a concentration of 1.5 M to 3 M, the organic solvent is a mixed solvent including a cyclic carbonate-based organic solvent and a linear carbonate-based organic solvent, and the compound represented by Formula 1 may be included in an amount of 0.1 wt % to 5 wt % based on a total weight of the non-aqueous electrolyte solution.

[Formula 1]

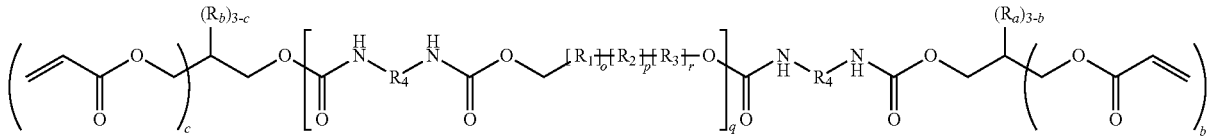

That is, the loading capacity denotes a discharge capacity per unit area which is measured using a half-cell that includes a positive electrode including a positive electrode active material. Specifically, after a half-cell is prepared by using a positive electrode active material such as $Li(Ni_{0.6}Mn_{0.2}Co_{0.2})O_2$ or $Li(Ni_{0.8}Mn_{0.1}Co_{0.1})O_2$, the loading capacity may be calculated by substituting discharge capacity, which is obtained by charging the half-cell at a rate of 0.1 C to 4.25 V at 25° C. under a constant current-constant voltage (CC-CV) condition and discharging the half-cell at a rate of 0.1 C to 2.5 V under a CC condition, into the following Equation.

In Formula 1, $R_1$ is an alkylene group having 1 to 5 carbon atoms which is unsubstituted or substituted with fluorine, or $-R_1'-O-$, wherein $R_1'$ is an alkylene group having 1 to 5 carbon atoms which is unsubstituted or substituted with fluorine, $R_2$ is an alkylene group having 1 to 3 carbon atoms which is unsubstituted or substituted with fluorine, or $-R_2'-O-$, wherein $R_2'$ is an alkylene group having 1 to 3 carbon atoms which is unsubstituted or substituted with fluorine, $R_3$ is an alkylene group having 1 to 5 carbon atoms which is unsubstituted or substituted with fluorine, $R_4$ is an aliphatic hydrocarbon group or an aromatic hydrocarbon group, $R_a$ and $R_b$ are each independently hydrogen or an alkyl group having 1 to 3 carbon atoms, o, p, q, and r are the numbers of repeating units, o is an integer of 1 to 5, p is an integer of 1 to 10, r is an integer of 1 to 5, q is an integer of 1 to 15, and b and c are each independently an integer of 1 to 3.

In this case, the lithium secondary battery according to the present invention may be a high-voltage lithium secondary battery which is operated at a high voltage of 4.2 V or more.

That is, the lithium secondary battery including the positive electrode and the non-aqueous electrolyte solution of the present invention exhibits excellent thermal stability when stored at room temperature and high temperature after charged at a high voltage of 4.2 V or more. Specifically, the lithium secondary battery may have a capacity retention of 80% or more and a resistance increase rate of 16% or less even after it is charged at a voltage of 4.2 V or more and then stored at 60° C. for 6 weeks or more, and may have a capacity retention of 85% or more even after it is charged at a voltage of 2.5 V to 4.2 V or more and then subjected to 150 cycles.

(1) Positive Electrode

First, in the lithium secondary battery according to the embodiment of the present invention, the positive electrode may be prepared by a conventional method and used.

That is, the positive electrode includes a positive electrode collector and a positive electrode material mixture layer formed on the positive electrode collector, and, in this case, the positive electrode material mixture layer may be prepared by coating the positive electrode collector with a positive electrode slurry including a positive electrode active material as well as selectively a binder, a conductive agent, and a solvent, and then drying and rolling the coated positive electrode collector.

In this case, it is desirable that the positive electrode material mixture layer formed on the positive electrode collector is formed to have a loading capacity of 3.7 mAh/cm$^2$ or more in order to prepare a positive electrode in which high capacity per unit area is secured.

Specifically, the loading capacity of the positive electrode material mixture layer may be in a range of 3.7 mAh/cm$^2$ to 10 mAh/cm$^2$, particularly 4 mAh/cm$^2$ to 8 mAh/cm$^2$, and more particularly 4 mAh/cm$^2$ to 6 mAh/cm$^2$.

In this case, if the loading capacity is less than 3.7 mAh/cm$^2$, it is difficult to ensure high capacity, and, if the loading capacity is greater than 10 mAh/cm$^2$, cycle characteristics may be degraded while a non-uniform reaction is intensified at a surface of the electrode due to an increase in thickness of the electrode.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where 0<Y<1), $LiMn_{2-Z}Ni_ZO_4$ (where 0<Z<2), etc.), lithium-nickel-cobalt-based oxide (e.g., $LiNi_{1-Y1}Co_{Y1}O_2$ (where 0<Y1<1), lithium-manganese-cobalt-based oxide (e.g., $LiCo_{1-Y2}Mn_{Y2}O_2$ (where 0<Y2<1), $LiMn_{2-Z1}Co_{Z1}O_4$ (where 0<Z1<2), etc.), lithium-nickel-manganese-cobalt-based oxide (e.g., $Li(Ni_pCo_qMn_{r1})O_2$ (where 0<p<1, 0<q<1, 0<r1<1, and p+q+r1=1) or $Li(Ni_{p1}Co_{q1}Mn_{r2})O_4$ (where 0<p1<2, 0<q1<2, 0<r2<2, and p1+q1+r2=2), etc.), or lithium-nickel-cobalt-transition metal (M) oxide (e.g., $Li(Ni_{p2} Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein 0<p2<1, 0<q2<1, 0<r3<1, O<S2<1, and p2+q2+r3+S2=1), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, and $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.).

The positive electrode active material may be included in an amount of 80 wt % to 99.5 wt %, for example, 85 wt % to 95 wt % based on a total weight of solid content in the positive electrode slurry. In a case in which the amount of the positive electrode active material is 80 wt % or less, since energy density is decreased, capacity may be reduced.

Also, the binder is a component that assists in the binding between the active material and the conductive agent and in the binding with the current collector, wherein the binder is commonly added in an amount of 1 wt % to 30 wt % based on the total weight of the solid content in the positive electrode slurry. If the amount of the binder is less than 1 wt %, adhesion between the electrode active material and the current collector may be insufficient, and, if the amount of the binder is greater than 30 wt %, the adhesion may be improved, but the amount of the positive electrode active material is reduced to such an extent that battery capacity may be reduced.

Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer, a styrene-butadiene rubber, a fluoro rubber, various copolymers, and the like.

Furthermore, the conductive agent may be added in an amount of 1 wt % to 20 wt % based on the total weight of the solid content in the positive electrode slurry. When the amount of the conductive agent is excessively small at less than 1 wt %, it is difficult to expect an effect of improving electrical conductivity or electrochemical properties of the battery may be degraded, and, when the amount of the conductive agent is excessively large at greater than 20 wt %, the amount of the positive electrode active material is relatively reduced so that capacity and energy density may be reduced.

The conductive agent is not particularly limited as long as it has conductivity without causing adverse chemical changes in the battery, and, for example, a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the positive electrode slurry including the positive electrode active material as well as selectively the binder and the conductive agent is in a range of 10 wt % to 60 wt %, for example, 20 wt % to 60 wt %.

(2) Negative Electrode

Also, in the lithium secondary battery according to the embodiment of the present invention, the negative electrode may be prepared by a conventional method and used.

Specifically, the negative electrode includes a negative electrode collector and a negative electrode material mixture layer formed on the negative electrode collector, and, in this case, the negative electrode material mixture layer may be prepared by coating the negative electrode collector with a negative electrode slurry including a negative electrode active material as well as selectively a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_{x3}Fe_2O_3$ ($0 \leq x3 \leq 1$), $Li_{x4}WO_2$ ($0 \leq x4 \leq 1$), and $Sn_{x5}Me_{1-x5}Me'_{y3}O_{z3}$ (Me: manganese (Mn), Fe, Pb, or Ge; Me': Al, boron (B), phosphorus (P), Si, Groups I, II and III elements of the periodic table, or halogen; $0 < x5 \leq 1$; $1 \leq y3 \leq 3$; $1 \leq z3 \leq 8$) may be used as the metal composite oxide.

The material, which may be doped and undoped with lithium, may include Si, $SiO_{x6}$ ($0 < x6 \leq 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubidium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content in the negative electrode slurry including the negative electrode active material as well as selectively the binder and the conductive agent is in a range of 50 wt % to 75 wt %, for example, 50 wt % to 80 wt %.

(3) Separator

Also, in the lithium secondary battery according to the embodiment of the present invention, the separator blocks an internal short circuit by separating the negative electrode and the positive electrode and provides a movement path of lithium ions, wherein any separator may be used without particular limitation as long as it is typically used as a separator in a lithium secondary battery, and particularly, a separator having high moisture-retention ability for an electrolyte solution as well as low resistance to the transfer of electrolyte ions may be used.

After mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used as the separator. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

In this case, the porous separator may generally have a pore diameter of 0.01 μm to 50 μm and a porosity of 5% to 95%. Also, the porous separator may generally have a thickness of 5 μm to 300 μm.

The lithium secondary battery of the present invention may secure high capacity by using the highly loaded positive electrode having a loading capacity of 3.7 mAh/cm$^2$, for example, 4 mAh/cm$^2$ or more, but, since the movement of lithium ions in a thickness direction is not uniform as the thickness of the electrode is increased, the reaction may non-uniformly occur.

Thus, the lithium secondary battery of the present invention may improve these disadvantages by including the non-aqueous electrolyte solution containing a high concentration lithium salt as well as the highly loaded positive electrode.

(4) Non-Aqueous Electrolyte Solution

Hereinafter, a non-aqueous electrolyte solution according to the present invention will be described.

(4-1) Lithium Salt

First, the non-aqueous electrolyte solution included in the lithium secondary battery of the present invention may include a high concentration lithium salt having a concentration of 1.5 M to 3 M, for example, 2 M to 2.5 M.

As described above, since the non-aqueous electrolyte solution of the present invention may increase a concentration of lithium ions in the battery by including the high concentration lithium salt, non-uniformity of reaction caused when the highly loaded positive electrode is used may not only be improved, but movement density of the lithium ions and oxidation stability may also be improved. Furthermore, a more stable film may be formed on the surface of the electrode by a lithium salt anion derivative.

In a case in which the concentration of the lithium salt is less than 1.5 M, since it is difficult to improve a decrease in lithium ion mobility caused by the highly loaded positive electrode, capacity characteristics at high-rate discharge may be degraded, and, in a case in which the concentration of the lithium salt is greater than 3 M, viscosity of the non-aqueous electrolyte solution may be excessively increased to significantly reduce wettability of the electrolyte.

The lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $SCN^-$, and $(CF_3CF_2SO_2)_2N^-$ as an anion. Specifically, the lithium salt may include at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCH$_3$CO$_2$, LiCF$_3$CO$_2$, LiAsF$_6$, LiSbF$_6$, LiAlCl$_4$, LiAlO$_4$, LiCH$_3$SO$_3$, LiN(SO$_2$CF$_2$CF$_3$)$_2$, LiN(SO$_2$F)$_2$, and LiN(SO$_2$CF$_3$)$_2$, and may more specifically include at least one selected from the group consisting of LiPF$_6$, LiBF$_4$, LiN(SO$_2$CF$_2$CF$_3$)$_2$, LiN(SO$_2$F)$_2$, and LiN(SO$_2$CF$_3$)$_2$.

(4-2) Organic Solvent

The non-aqueous electrolyte solution included in the lithium secondary battery of the present invention may include an organic solvent as well as the lithium salt.

It is desirable that a cyclic carbonate-based organic solvent having high ionic conductivity and high dielectric constant and a linear carbonate-based organic solvent having low viscosity and low dielectric constant are mixed and used as the organic solvent included in the non-aqueous electrolyte solution so as to minimize decomposition due to an oxidation reaction during charge and discharge of the secondary battery and exhibit desired characteristics with an additive.

The cyclic carbonate-based organic solvent may specifically include at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), and, among them, the cyclic carbonate-based organic solvent may include ethylene carbonate capable of maintaining passivation ability of a stable solid electrolyte interface (SEI).

The linear carbonate-based organic solvent may include at least one organic solvent selected from the group consisting of dimethyl carbonate (DMC), diethyl carbonate (DEC), dipropyl carbonate, ethylmethyl carbonate (EMC), methylpropyl carbonate, and ethylpropyl carbonate, and, among them, the linear carbonate-based organic solvent may include dimethyl carbonate (DMC) having low viscosity characteristics while having a small molecular size among the linear carbonate-based organic solvents.

Specifically, in order to minimize an increase in the viscosity of the non-aqueous electrolyte solution of the present invention due to the high concentration lithium salt, an electrolyte solution with better performance may be prepared when the cyclic carbonate-based organic solvent and the linear carbonate-based organic solvent are mixed in a volume ratio of about 0.5:9.5 to about 2:8, particularly 0.5:9.5 to 1:9, and more particularly 0.7:9.3 to 1:9 and used.

That is, in a case in which a high concentration lithium salt having a concentration of 1.5 M or more is used, the passivation ability of the stable SEI may be maintained when the mixing ratio of the cyclic carbonate-based organic solvent is 0.5 or more, and, when the mixing ratio of the cyclic carbonate-based organic solvent is 2 or less, for example, 1 or less, since electrolyte-solution wetting may be improved by preventing the increase in the viscosity of the electrolyte solution, stability at high voltage may be increased.

Also, the organic solvent may further include at least one selected from the group consisting of at least one ester-based organic solvent, which is selected from the group consisting of a linear ester-based organic solvent and a cyclic ester-based organic solvent, an ether-based solvent, and a nitrile-based solvent.

The linear ester-based organic solvent may include at least one organic solvent selected from the group consisting of methyl acetate, ethyl acetate, propyl acetate, methyl propionate, ethyl propionate, propyl propionate, and butyl propionate.

Specific examples of the cyclic ester-based organic solvent may be at least one organic solvent selected from the group consisting of γ-butyrolactone, γ-valerolactone, γ-caprolactone, σ-valerolactone, and ε-caprolactone.

Any one selected from the group consisting of dimethyl ether, diethyl ether, dipropyl ether, methylethyl ether, methylpropyl ether, and ethylpropyl ether or a mixture of two or more thereof may be used as the ether-based solvent.

The nitrile-based solvent may include at least one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

(4-3) Additive

Also, the non-aqueous electrolyte solution may include the compound represented by Formula 1, as a first additive, to reduce surface tension of the electrolyte solution in which wetting is deteriorated by the increase in the viscosity of the non-aqueous electrolyte solution due to the application of the high concentration lithium salt.

In this case, in the compound represented by Formula 1, $R_1$ may be —$R_1'$—O—, wherein $R_1'$ is an alkylene group having 1 to 5 carbon atoms which is substituted with fluorine, $R_2$ may be —$R_2'$—O—, wherein $R_2'$ is an alkylene group having 1 to 3 carbon atoms which is substituted with fluorine, and $R_3$ may be an alkylene group having 1 to 3 carbon atoms which is unsubstituted or substituted with fluorine.

In the compound represented by Formula 1, the aliphatic hydrocarbon group may include an alicyclic hydrocarbon group or a linear hydrocarbon group.

The alicyclic hydrocarbon group may include at least one selected from the group consisting of a substituted or unsubstituted cycloalkylene group having 4 to 20 carbon atoms; a substituted or unsubstituted cycloalkylene group having 4 to 20 carbon atoms which contains an isocyanate group (NCO); a substituted or unsubstituted cycloalkenylene group having 4 to 20 carbon atoms; and a substituted or unsubstituted heterocycloalkylene group having 2 to 20 carbon atoms.

The linear hydrocarbon group may include at least one selected from the group consisting of a substituted or unsubstituted alkylene group having 1 to 20 carbon atoms; a substituted or unsubstituted alkylene group having 1 to 20 carbon atoms which contains an isocyanate group (NCO); a substituted or unsubstituted alkoxylene group having 1 to 20 carbon atoms; a substituted or unsubstituted alkenylene group having 2 to 20 carbon atoms; and a substituted or unsubstituted alkynylene group having 2 to 20 carbon atoms.

Furthermore, the aromatic hydrocarbon group may include a substituted or unsubstituted arylene group having 6 to 20 carbon atoms; or a substituted or unsubstituted heteroarylene group having 2 to 20 carbon atoms.

Specifically, the compound represented by Formula 1 may be a compound represented by Formula 1a below.

[Formula 1a]

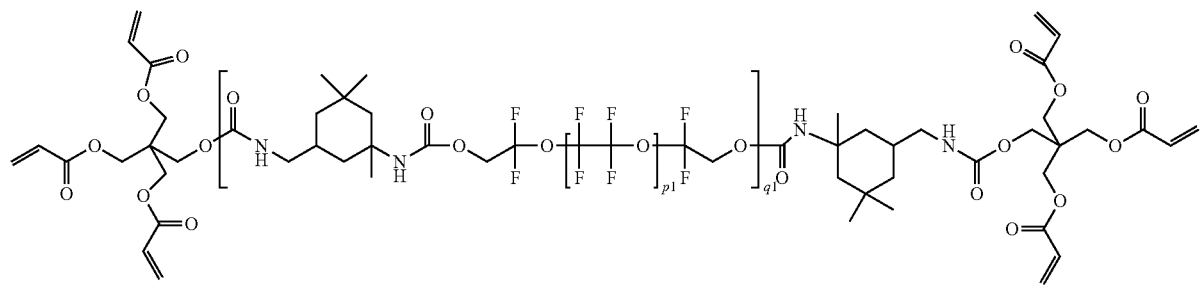

In Formula 1a,
p1 and q1 are the numbers of repeating units,
p1 is an integer of 1 to 10, and
q1 is an integer of 1 to 5.

The compound represented by Formula 1 may be included in an amount of 0.1 wt % to 5 wt %, particularly 0.1 wt % to 3 wt %, and more particularly 0.1 wt % to 1 wt % based on the total weight of the non-aqueous electrolyte solution.

In this case, since the compound represented by Formula 1 is included at the above concentration in the non-aqueous electrolyte solution, the wetting in the battery due to high viscosity may be improved. If the amount of the first additive is less than 0.1 wt %, an effect of the electrolyte-solution wetting in the battery may be insignificant, and, if the amount of the first additive is greater than 5 wt %, an increase in resistance and restriction of the movement of lithium ions, for example, a decrease in ionic conductivity due to the excessive amount of the additive may occur.

In this case, a weight-average molecular weight (Mw) of the compound represented by Formula 1 may be controlled by the number of repeating units, and may be in a range of about 1,000 g/mol to about 100,000 g/mol, particularly 1,000 g/mol to 50,000 g/mol, and more particularly 1,000 g/mol to 10,000 g/mol.

In a case in which the weight-average molecular weight of the compound represented by Formula 1 is within the above range, since affinity with the electrolyte solvent is high, a uniform electrolyte solution may be prepared.

The weight-average molecular weight may denote a standard polystyrene-equivalent value measured by gel permeation chromatography (GPC), and, unless otherwise specified, a molecular weight may denote the weight-average molecular weight. For example, in the present invention, the GPC conditions are as follows: the weight-average molecular weight is measured by using 1200 series by Agilent Technologies, a PL mixed B column by Agilent Technologies may be used in this case, and tetrahydrofuran (THF) may be used as a solvent.

In general, in a case in which a positive electrode containing a highly loaded positive electrode material mixture layer is included during the preparation of a secondary battery, discharge performance at a high rate may be reduced due to an increase in movement path of lithium in the battery. Thus, since the non-aqueous electrolyte solution containing the high concentration lithium salt is included in the present invention, the movement density of the lithium ions and the oxidation stability may be improved and a stable film may be formed from the lithium salt anion derivative on the surface of the electrode.

However, the non-aqueous electrolyte solution containing the high concentration lithium salt is disadvantageous in that the electrolyte solution wetting is deteriorated due to the increase in viscosity. Thus, since the non-aqueous electrolyte solution of the present invention may reduce surface tension at the electrode to improve interfacial resistance by further including the compound represented by Formula 1, an effect of improving wetting to the electrode and the separator may be obtained.

That is, since the compound represented by Formula 1 contains a urethane group (—NH—C(O)O—) and a tetrafluoroethylene group, as a hydrophobic par, in its main chain as well as an acrylate functional group as a hydrophilic group capable of forming a crosslink at both ends of the main chain by itself, the compound represented by Formula 1 may exhibit a balanced affinity for a positive electrode or separator (SRS layer), as a hydrophilic part, and a negative electrode or separator fabric, as a hydrophobic part, to act as a surfactant. Furthermore, since the compound represented by Formula 1 is electrochemically stable, it not only has high reduction stability, but also possesses the ability to dissociate the lithium salt, and thus, the compound represented by Formula 1 may minimize a reduction reaction on a surface of the negative electrode and may further improve lithium ion mobility.

Thus, a lithium secondary battery having improved storage characteristics, life characteristics, and capacity characteristics after high-temperature storage may be prepared by improving limitations due to lithium precipitation and a side reaction of the battery caused by a reduction in the electrolyte wetting of the lithium secondary battery which includes the positive electrode containing the highly loaded positive electrode material mixture layer and the highly viscous non-aqueous electrolyte solution containing the high concentration lithium salt.

Furthermore, in general, an organic solvent is disadvantageous in that it degrades performance of a secondary battery while being decomposed during high-temperature storage to cause a side reaction. However, with respect to the non-aqueous electrolyte solution included in the lithium secondary battery of the present invention, since the concentration of the lithium ions in the non-aqueous electrolyte solution is high, the decomposition of the solvent at high temperature and the resulting side reaction may be prevented by reducing the amount of free solvent due to the coordination bonds between the organic solvent and $Li^+$ in the battery, and thus, performance degradation of the secondary battery may be improved.

In addition to the compound represented by Formula 1, the non-aqueous electrolyte solution included in the lithium secondary battery of the present invention may further include at least one second additive selected from the group consisting of vinylene carbonate (VC), vinyl ethylene carbonate, 1,3-propane sultone (PS), 1,3-propene sultone (PRS), succinonitrile (SN), adiponitrile (Adn), ethylene sulfate (Esa), trimethylene sulfate (TMS), methyl trimethylene sulfate (MTMS), fluoroethylene carbonate (FEC), $LiPO_2F_2$, LiBOB (lithium bis(oxalato)borate ($LiB(C_2O_4)_2$)), $LiBF_4$, tetramethyltrimethylsilyl phosphate, trimethylsilyl phosphite, tris(2,2,2-trifluoroethyl)phosphate, and tris(trifluoroethyl)phosphite.

Among these second additives, it is known that particularly vinylene carbonate, 1,3-propane sultone, succinonitrile, and ethylene sulfate may form a more stable SEI on the surface of the negative electrode together with lithium difluorophosphate during an initial activation process of the secondary battery.

The second additive may be included in an amount of 10 wt % or less, for example, 0.5 wt % to 7 wt % based on the total weight of the non-aqueous electrolyte solution.

If the amount of the second additive is greater than 10 wt %, there is possibility that the side reaction in the electrolyte solution may not only occur excessively during charge and discharge of the battery, but also, since the second additive may not be sufficiently decomposed at high temperature, the second additive may be present in the form of an unreacted material or precipitates in the electrolyte solution at room temperature, and, accordingly, life or resistance characteristics of the secondary battery may be degraded.

As described above, since the lithium secondary battery of the present invention includes the positive electrode containing the highly loaded positive electrode material mixture layer and the non-aqueous electrolyte solution containing the high concentration lithium salt and the compound represented by Formula 1 as an additive, uniformity of the reaction may be ensured by facilitating the movement of lithium ions even if the highly loaded positive electrode is used and the wetting of the non-aqueous electrolyte solution to the electrode may be improved even if the non-aqueous electrolyte solution containing the high concentration lithium salt is used. In addition, since the performance degradation caused by the decomposition of the solvent at high temperature and the resulting side reaction may be improved by reducing the amount of free solvent due to the coordination bonds between the solvent and $Li^+$ in the battery, a lithium secondary battery having more improved storage characteristics, life characteristics, and capacity characteristics even after storage or charge and discharge at high temperature as well as having high capacity may be prepared.

A shape of the lithium secondary battery of the present invention is not particularly limited, but the lithium secondary battery may be used in various forms, such as a cylindrical type, a prismatic type, a pouch type, or a coin type, depending on the purpose. The lithium secondary battery according to the embodiment of the present invention may be a pouch-type secondary battery.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Positive Electrode Preparation)

Li(Ni$_{0.6}$Mn$_{0.2}$Co$_{0.2}$)O$_2$ (NCM) as a positive electrode active material, carbon black as a conductive agent, and polyvinylidene fluoride, as a binder, were added in a weight ratio of 94:3:3 to N-methyl-2-pyrrolidone (NMP) to prepare a positive electrode slurry (solid content of 50 wt %). An about 20 µm thick aluminum (Al) thin film, as a positive electrode collector, was coated with the positive electrode mixture slurry (loading capacity: 4 mAh/cm$^2$), dried, and roll-pressed to prepare a positive electrode (see Table 1 below).

(Negative Electrode Preparation)

Artificial graphite as a negative electrode active material, PVDF as a binder, and carbon black, as a conductive agent, were added in a weight ratio of 96:3:1 to NMP to prepare a negative electrode slurry (solid content of 80 wt %). A 10 µm thick copper (Cu) thin film, as a negative electrode collector, was coated with the negative electrode mixture slurry, dried, and roll-pressed to prepare a negative electrode.

(Non-Aqueous Electrolyte Solution Preparation)

A non-aqueous electrolyte solution was prepared by adding 0.1 g of the compound represented by Formula 1a (weight-average molecular weight (Mw): 5,000, p1=5, and q1=3) to 99.9 g of an organic solvent (ethylene carbonate:dimethyl carbonate=volume ratio of 1:9) in which 2 M LiPF$_6$ was dissolved.

(Secondary Battery Preparation)

An electrode assembly was prepared by disposing a polyolefin-based separator (polypropylene/polyethylene/polypropylene (PP/PE/PP) three layer structure, thickness: 20 µm) between the above-prepared positive electrode and negative electrode, the electrode assembly was accommodated in a pouch-type battery case, and the above-prepared non-aqueous electrolyte solution was injected to prepare a 4.2 V-class secondary battery (full cell) (see Table 1 below).

Example 2

(Positive Electrode Preparation)

Li(Ni$_{0.6}$Mn$_{0.2}$Co$_{0.2}$)O$_2$ (NCM) as a positive electrode active material, carbon black as a conductive agent, and polyvinylidene fluoride, as a binder, were added in a weight ratio of 94:3:3 to N-methyl-2-pyrrolidone (NMP) to prepare a positive electrode slurry (solid content of 50 wt %). An about 20 µm thick aluminum (Al) thin film, as a positive electrode collector, was coated with the positive electrode mixture slurry (loading capacity: 5 mAh/cm$^2$), dried, and roll-pressed to prepare a positive electrode (see Table 1 below).

(Non-Aqueous Electrolyte Solution Preparation)

A non-aqueous electrolyte solution was prepared by adding 0.5 g of the compound represented by Formula 1a (weight-average molecular weight (Mw): 5,000, p1=5, and q1=3) to 99.5 g of an organic solvent (ethylene carbonate:dimethyl carbonate=volume ratio of 1:9) in which 2 M LiPF$_6$ was dissolved.

(Secondary Battery Preparation)

A secondary battery was prepared in the same manner as in Example 1 except that the above-prepared positive electrode and non-aqueous electrolyte solution were used (see Table 1 below).

Example 3

(Non-Aqueous Electrolyte Solution Preparation)

A non-aqueous electrolyte solution was prepared by adding 0.5 g of the compound represented by Formula 1a (weight-average molecular weight (Mw): 5,000, p1=5, and q1=3) to 99.5 g of an organic solvent (ethylene carbonate:dimethyl carbonate=volume ratio of 1:9) in which 1 M LiPF$_6$ and 1 M LiFSI were dissolved.

(Secondary Battery Preparation)

A secondary battery was prepared in the same manner as in Example 2 except that the above non-aqueous electrolyte solution was used (see Table 1 below).

Example 4

(Non-Aqueous Electrolyte Solution Preparation)

A non-aqueous electrolyte solution was prepared by adding 1.0 g of the compound represented by Formula 1a (weight-average molecular weight (Mw): 5,000, p1=5, and q1=3) to 99 g of an organic solvent (ethylene carbonate:dimethyl carbonate=volume ratio of 1:9) in which 2 M LiPF$_6$ was dissolved.

(Secondary Battery Preparation)

A secondary battery was prepared in the same manner as in Example 2 except that the above non-aqueous electrolyte solution was used (see Table 1 below).

Example 5

(Non-aqueous Electrolyte Solution Preparation)

A non-aqueous electrolyte solution was prepared by adding 0.5 g of the compound represented by Formula 1a (weight-average molecular weight (Mw): 5,000, p1=5, and q1=3) to 99.5 g of an organic solvent (ethylene carbonate:dimethyl carbonate=volume ratio of 1:9) in which 2.5 M LiPF$_6$ was dissolved.

(Secondary Battery Preparation)

A secondary battery was prepared in the same manner as in Example 2 except that the above non-aqueous electrolyte solution was used (see Table 1 below).

Example 6

(Non-Aqueous Electrolyte Solution Preparation)

A non-aqueous electrolyte solution was prepared by adding 3.0 g of the compound represented by Formula 1a (weight-average molecular weight (Mw): 5,000, p1=5, and q1=3) to 97 g of an organic solvent (ethylene carbonate: dimethyl carbonate=volume ratio of 1:9) in which 2.5 M $LiPF_6$ was dissolved.

(Secondary Battery Preparation)

A secondary battery was prepared in the same manner as in Example 2 except that the above non-aqueous electrolyte solution was used (see Table 1 below).

Example 7

(Non-Aqueous Electrolyte Solution Preparation)

A non-aqueous electrolyte solution was prepared by adding 0.5 g of the compound represented by Formula 1a (weight-average molecular weight (Mw): 5,000, p1=5, and q1=3) to 99.5 g of an organic solvent (ethylene carbonate: dimethyl carbonate=volume ratio of 1:9) in which 3 M $LiPF_6$ was dissolved.

(Secondary Battery Preparation)

A secondary battery was prepared in the same manner as in Example 2 except that the above non-aqueous electrolyte solution was used (see Table 1 below).

Example 8

(Positive Electrode Preparation)

$Li(Ni_{0.6}Mn_{0.2}Co_{0.2})O_2$ (NCM) as a positive electrode active material, carbon black as a conductive agent, and polyvinylidene fluoride, as a binder, were added in a weight ratio of 94:3:3 to N-methyl-2-pyrrolidone (NMP) to prepare a positive electrode slurry (solid content of 50 wt %). An about 20 μm thick aluminum (Al) thin film, as a positive electrode collector, was coated with the positive electrode mixture slurry (loading capacity: 6 $mAh/cm^2$), dried, and roll-pressed to prepare a positive electrode (see Table 1 below).

(Non-Aqueous Electrolyte Solution Preparation)

A non-aqueous electrolyte solution was prepared by adding 0.5 g of the compound represented by Formula 1a (weight-average molecular weight (Mw): 5,000, p1=5, and q1=3) to 99.5 g of an organic solvent (ethylene carbonate: dimethyl carbonate=volume ratio of 1:9) in which 2 M $LiPF_6$ was dissolved.

(Secondary Battery Preparation)

A secondary battery was prepared in the same manner as in Example 1 except that the above-prepared positive electrode and non-aqueous electrolyte solution were used (see Table 1 below).

Example 9

(Non-Aqueous Electrolyte Solution Preparation)

A non-aqueous electrolyte solution was prepared by adding 5 g of the compound represented by Formula 1a (weight-average molecular weight (Mw): 5,000, p1=5, and q1=3) to 95 g of an organic solvent (ethylene carbonate:dimethyl carbonate=volume ratio of 1:9) in which 2 M $LiPF_6$ was dissolved.

(Secondary Battery Preparation)

A secondary battery was prepared in the same manner as in Example 2 except that the above non-aqueous electrolyte solution was used (see Table 1 below).

Example 10

(Non-Aqueous Electrolyte Solution Preparation)

A non-aqueous electrolyte solution was prepared by adding 0.5 g of the compound represented by Formula 1a (weight-average molecular weight (Mw): 5,000, p1=5, and q1=3) to 99.5 g of an organic solvent (ethylene carbonate: dimethyl carbonate=volume ratio of 2:8) in which 3 M $LiPF_6$ was dissolved.

(Secondary Battery Preparation)

A secondary battery was prepared in the same manner as in Example 2 except that the above non-aqueous electrolyte solution was used (see Table 1 below).

Comparative Example 1

(Positive Electrode Preparation)

$Li(Ni_{0.6}Mn_{0.2}Co_{0.2})O_2$ (NCM) as a positive electrode active material, carbon black as a conductive agent, and polyvinylidene fluoride, as a binder, were added in a weight ratio of 94:3:3 to N-methyl-2-pyrrolidone (NMP) to prepare a positive electrode slurry (solid content of 50 wt %). An about 20 μm thick aluminum (Al) thin film, as a positive electrode collector, was coated with the positive electrode mixture slurry (loading capacity: 3 $mAh/cm^2$), dried, and roll-pressed to prepare a positive electrode (see Table 1 below).

(Negative Electrode Preparation)

Artificial graphite as a negative electrode active material, PVDF as a binder, and carbon black, as a conductive agent, were added in a weight ratio of 96:3:1 to NMP to prepare a negative electrode slurry (solid content of 80 wt %). A 10 μm thick copper (Cu) thin film, as a negative electrode collector, was coated with the negative electrode mixture slurry, dried, and roll-pressed to prepare a negative electrode.

(Non-Aqueous Electrolyte Solution Preparation)

A non-aqueous electrolyte solution was prepared by adding 0.5 g of the compound represented by Formula 1a (weight-average molecular weight (Mw): 5,000, p1=5, and q1=3) to 99.5 g of an organic solvent (ethylene carbonate: dimethyl carbonate=volume ratio of 1:9) in which 2 M $LiPF_6$ was dissolved.

(Secondary Battery Preparation)

An electrode assembly was prepared by disposing a polyolefin-based separator (polypropylene/polyethylene/polypropylene (PP/PE/PP) three layer structure, thickness: 20 μm) between the above-prepared positive electrode and negative electrode, the electrode assembly was accommodated in a pouch-type battery case, and the above-prepared non-aqueous electrolyte solution was injected to prepare a 4.2 V-class secondary battery (full cell) (see Table 1 below).

Comparative Example 2

(Non-Aqueous Electrolyte Solution Preparation)

A non-aqueous electrolyte solution was prepared by dissolving 0.7 M $LiPF_6$ and 0.5 M LiFSI in an organic solvent (ethylene carbonate:dimethyl carbonate=volume ratio of 3:7).

(Secondary Battery Preparation)

A secondary battery was prepared in the same manner as in Comparative Example 1 except that the above-prepared non-aqueous electrolyte solution was used (see Table 1 below).

Comparative Example 3

(Positive Electrode Preparation)

$Li(Ni_{0.6}Mn_{0.2}Co_{0.2})O_2$ (NCM) as a positive electrode active material, carbon black as a conductive agent, and polyvinylidene fluoride, as a binder, were added in a weight ratio of 94:3:3 to N-methyl-2-pyrrolidone (NMP) to prepare a positive electrode slurry (solid content of 50 wt %). An about 20 μm thick aluminum (Al) thin film, as a positive electrode collector, was coated with the positive electrode mixture slurry (loading capacity: 5 mAh/cm$^2$), dried, and roll-pressed to prepare a positive electrode (see Table 1 below).

(Non-Aqueous Electrolyte Solution Preparation)

A non-aqueous electrolyte solution was prepared by dissolving 0.7 M LiPF$_6$ and 0.5 M LiFSI in an organic solvent (ethylene carbonate:dimethyl carbonate=volume ratio of 3:7).

(Secondary Battery Preparation)

A secondary battery was prepared in the same manner as in Comparative Example 1 except that the above-prepared positive electrode and non-aqueous electrolyte solution were used (see Table 1 below).

Comparative Example 4

(Positive Electrode Preparation)

Li(Ni$_{0.6}$Mn$_{0.2}$Co$_{0.2}$)O$_2$ (NCM) as a positive electrode active material, carbon black as a conductive agent, and polyvinylidene fluoride, as a binder, were added in a weight ratio of 94:3:3 to N-methyl-2-pyrrolidone (NMP) to prepare a positive electrode slurry (solid content of 50 wt %). An about 20 μm thick aluminum (Al) thin film, as a positive electrode collector, was coated with the positive electrode mixture slurry (loading capacity: 6 mAh/cm$^2$), dried, and roll-pressed to prepare a positive electrode (see Table 1 below).

(Non-Aqueous Electrolyte Solution Preparation)

A non-aqueous electrolyte solution was prepared by dissolving 0.7 M LiPF$_6$ and 0.5 M LiFSI in an organic solvent (ethylene carbonate:dimethyl carbonate=volume ratio of 3:7).

(Secondary Battery Preparation)

A secondary battery was prepared in the same manner as in Comparative Example 1 except that the above-prepared positive electrode and non-aqueous electrolyte solution were used (see Table 1 below).

Comparative Example 5

(Positive Electrode Preparation)

Li(Ni$_{0.6}$Mn$_{0.2}$Co$_{0.2}$)O$_2$ (NCM) as a positive electrode active material, carbon black as a conductive agent, and polyvinylidene fluoride, as a binder, were added in a weight ratio of 94:3:3 to N-methyl-2-pyrrolidone (NMP) to prepare a positive electrode slurry (solid content of 50 wt %). An about 20 μm thick aluminum (Al) thin film, as a positive electrode collector, was coated with the positive electrode mixture slurry (loading capacity: 5 mAh/cm$^2$), dried, and roll-pressed to prepare a positive electrode (see Table 1 below).

(Non-Aqueous Electrolyte Solution Preparation)

A non-aqueous electrolyte solution was prepared by dissolving 2 M LiPF$_6$ in an organic solvent (ethylene carbonate:dimethyl carbonate=volume ratio of 3:7).

(Secondary Battery Preparation)

A secondary battery was prepared in the same manner as in Comparative Example 1 except that the above-prepared positive electrode and non-aqueous electrolyte solution were used (see Table 1 below).

Comparative Example 6

(Positive Electrode Preparation)

Li(Ni$_{0.6}$Mn$_{0.2}$Co$_{0.2}$)O$_2$ (NCM) as a positive electrode active material, carbon black as a conductive agent, and polyvinylidene fluoride, as a binder, were added in a weight ratio of 94:3:3 to N-methyl-2-pyrrolidone (NMP) to prepare a positive electrode slurry (solid content of 50 wt %). An about 20 μm thick aluminum (Al) thin film, as a positive electrode collector, was coated with the positive electrode mixture slurry (loading capacity: 5 mAh/cm$^2$), dried, and roll-pressed to prepare a positive electrode (see Table 1 below).

(Non-Aqueous Electrolyte Solution Preparation)

A non-aqueous electrolyte solution was prepared by adding 0.5 g of the compound represented by Formula 1a (weight-average molecular weight (Mw): 5,000, p1=5, and q1=3) to 99.5 g of an organic solvent (ethylene carbonate:dimethyl carbonate=volume ratio of 1:9) in which 1 M LiPF$_6$ was dissolved.

(Secondary Battery Preparation)

A secondary battery was prepared in the same manner as in Comparative Example 1 except that the above non-aqueous electrolyte solution was used (see Table 1 below).

Comparative Example 7

(Positive Electrode Preparation)

Li(Ni$_{0.6}$Mn$_{0.2}$Co$_{0.2}$)O$_2$ (NCM) as a positive electrode active material, carbon black as a conductive agent, and polyvinylidene fluoride, as a binder, were added in a weight ratio of 94:3:3 to N-methyl-2-pyrrolidone (NMP) to prepare a positive electrode slurry (solid content of 50 wt %). An about 20 μm thick aluminum (Al) thin film, as a positive electrode collector, was coated with the positive electrode mixture slurry (loading capacity: 5 mAh/cm$^2$), dried, and roll-pressed to prepare a positive electrode (see Table 1 below).

(Non-Aqueous Electrolyte Solution Preparation)

A non-aqueous electrolyte solution was prepared by adding 0.5 g of the compound represented by Formula 1a (weight-average molecular weight (Mw): 5,000, p1=5, and q1=3) to 99.5 g of an organic solvent (dimethyl carbonate) in which 2 M LiPF$_6$ was dissolved.

(Secondary Battery Preparation)

A secondary battery was prepared in the same manner as in Comparative Example 1 except that the above-prepared positive electrode and non-aqueous electrolyte solution were used (see Table 1 below).

Comparative Example 8

(Positive Electrode Preparation)

Li(Ni$_{0.6}$Mn$_{0.2}$Co$_{0.2}$)O$_2$ (NCM) as a positive electrode active material, carbon black as a conductive agent, and polyvinylidene fluoride, as a binder, were added in a weight ratio of 94:3:3 to N-methyl-2-pyrrolidone (NMP) to prepare a positive electrode slurry (solid content of 50 wt %). An about 20 μm thick aluminum (Al) thin film, as a positive electrode collector, was coated with the positive electrode mixture slurry (loading capacity: 11 mAh/cm$^2$), dried, and roll-pressed to prepare a positive electrode (see Table 1 below).

(Non-Aqueous Electrolyte Solution Preparation)

A non-aqueous electrolyte solution was prepared by adding 0.5 g of the compound represented by Formula 1a (weight-average molecular weight (Mw): 5,000, p1=5, and q1=3) to 99.5 g of an organic solvent (dimethyl carbonate) in which 2 M LiPF$_6$ was dissolved.

(Secondary Battery Preparation)

A secondary battery was prepared in the same manner as in Comparative Example 1 except that the above-prepared positive electrode and non-aqueous electrolyte solution were used (see Table 1 below).

Comparative Example 9

(Positive Electrode Preparation)

Li(Ni$_{0.6}$Mn$_{0.2}$Co$_{0.2}$)O$_2$ (NCM) as a positive electrode active material, carbon black as a conductive agent, and polyvinylidene fluoride, as a binder, were added in a weight ratio of 94:3:3 to N-methyl-2-pyrrolidone (NMP) to prepare a positive electrode slurry (solid content of 50 wt %). An about 20 μm thick aluminum (Al) thin film, as a positive electrode collector, was coated with the positive electrode mixture slurry (loading capacity: 5 mAh/cm$^2$), dried, and roll-pressed to prepare a positive electrode (see Table 1 below).

(Non-Aqueous Electrolyte Solution Preparation)

A non-aqueous electrolyte solution was prepared by adding 6 g of the compound represented by Formula 1a (weight-average molecular weight (Mw): 5,000, p1=5, and q1=3) to 94 g of an organic solvent (dimethyl carbonate) in which 2 M LiPF$_6$ was dissolved.

(Secondary Battery Preparation)

A secondary battery was prepared in the same manner as in Comparative Example 1 except that the above-prepared positive electrode and non-aqueous electrolyte solution were used (see Table 1 below).

EXPERIMENTAL EXAMPLES

Experimental Example 1. Direct Current Internal Resistance Evaluation Test at Low Temperature (−10° C.)

After each of the secondary batteries prepared in Examples 1 to 6, 8, and 10 and Comparative Examples 1 to 9 was subjected to a formation process at a rate of 0.1 C for 3 hours at 25° C., each secondary battery was charged at a rate of 0.33 C to 4.25 V under a constant current-constant voltage (CC-CV) condition at 25° C. and discharged at a rate of 0.33 C to 2.5 V under a constant current (CC) condition. The above charging and discharging were set as one cycle, and 3 cycles of initial charging and discharging were performed.

Subsequently, at a state of charge (SOC) of 50%, direct current internal resistance (DCIR) at low temperature of each secondary battery was measured by using a voltage difference generated by discharging the battery at a rate of 2.5 C for 30 seconds at a low temperature (−10° C.). The results thereof are presented in Table 1 below.

Referring to Table 1, most of the lithium secondary batteries prepared in Comparative Examples 1 to 9 had a DCIR at low temperature of about 412 mohm or more, but it may be confirmed that the direct current internal resistances (DCIRs) at low temperature of the lithium secondary batteries prepared in Examples 1 to 6, 8, and 10 were improved to 400 mohm or less.

Specifically, since the lithium secondary batteries prepared in Comparative Examples 2 to 5, which did not include the first additive, had high surface tension of the electrolyte solution, it may be understood that the DCIRs at low temperature were increased in comparison to those of the lithium secondary batteries prepared in Examples 1 to 6, 8, and 10.

Also, it was difficult for the lithium secondary battery prepared in Comparative Example 1, in which the loading capacity of the positive electrode material mixture layer was low, to secure high capacity, it may be understood that the DCIR at low temperature was increased in comparison to those of the lithium secondary batteries prepared in Examples 1 to 6, 8, and 10.

Furthermore, with respect to the lithium secondary battery prepared in Comparative Example 6 in which the concentration of the lithium salt was low, since diffusion resistance of Li ions was increased due to a decrease in concentration of the Li ions in pores of the electrode caused by the low concentration lithium salt, it may be understood that the DCIR at low temperature was increased in comparison to those of the lithium secondary batteries prepared in Examples 1 to 6, 8, and 10.

Also, with respect to the lithium secondary battery prepared in Comparative Example 7 which only included dimethyl carbonate as the electrolyte solution solvent, since it was difficult to form a stable SEI passivation film, the DCIR at low temperature was about 411 mohm, wherein it may be understood that the DCIR at low temperature was increased in comparison to those of the lithium secondary batteries prepared in Examples 1 to 6, 8, and 10.

With respect to the lithium secondary battery prepared in Comparative Example 8 in which the loading capacity of the positive electrode material mixture layer was high, it may be understood that the DCIR at low temperature was increased in comparison to those of the lithium secondary batteries prepared in Examples 1 to 6, 8, and 10 while the non-uniform reaction of the electrode was intensified as the thickness of the electrode was increased.

Particularly, the DCIR at low temperature deteriorated as negative electrode interfacial resistance was increased, wherein the lithium secondary battery prepared in Comparative Example 9, in which the amount of the additive was large, had a DCIR at low temperature of about 429 mohm, but it may be understood that the DCIRs at low temperature of the lithium secondary batteries prepared in Examples 1 to 6, 8, and 10, in which the amount of the additive was low at 5 wt %, were improved.

Experimental Example 2. 2 C Discharge Capacity Evaluation Test

After each of the secondary batteries prepared in Examples 1 to 8 and 10 and Comparative Examples 1 to 9 was subjected to a formation process at a rate of 0.1 C for 3 hours at 25° C., each secondary battery was charged at a rate of 0.33 C to 4.25 V under a CC-CV condition at 25° C. and discharged at a rate of 0.33 C to 2.5 V under a CC condition. The above charging and discharging were set as one cycle, and 3 cycles of initial charging and discharging were performed.

Subsequently, the secondary battery was charged at a rate of 0.33 C to 4.25 V under a CC-CV condition and discharged at a rate of 0.1 C to 2.5 V under a CC condition, and discharge capacity (1) was then measured. Next, the secondary battery was charged at a rate of 0.33 C to 4.25 V under a CC condition and discharged at a rate of 2 C to 2.5 V under a CV condition, and discharge capacity (2) was measured.

The discharge capacity (2) after the 2 C discharge relative to the discharge capacity (1) was expressed as a relative ratio based on the discharge capacity (1) measured before the 2 C discharge (100%), and the results thereof are presented in Table 1 below.

Referring to the following Table 1, with respect to the secondary batteries prepared in Examples 1 to 7, discharge capacities after the 2 C discharge were 80% or more, wherein it may be understood that the discharge capacities after the 2 C discharge were improved in comparison to those of the secondary batteries prepared in Comparative Examples 1 to 9.

In this case, with respect to the secondary battery prepared in Example 8 which included the highly loaded positive electrode, since a temporary Li shortage phenomenon occurred in a thickness direction during the 2 C discharge, it may be understood that the 2 C discharge capacity was relatively lower than those of the secondary batteries prepared in Examples 1 to 7.

Also, with respect to the secondary battery prepared in Example 10 in which a content ratio of the cyclic carbonate-based solvent was high, since wettability was decreased while the viscosity of the electrolyte was increased, it may be understood that the high-rate discharge capacity was relatively degraded in comparison to those of the secondary batteries prepared in Examples 1 to 7.

With respect to the secondary batteries prepared in Comparative Examples 2 to 4, since the concentration of the lithium salt was low in comparison to the high electrode loading capacity, it may be understood that the discharge capacities after the 2 C discharge were significantly degraded in comparison to those of the secondary batteries prepared in Examples 1 to 7.

Furthermore, with respect to the lithium secondary battery prepared in Comparative Example 7 which only included dimethyl carbonate as the electrolyte solution solvent, since it was difficult to form a stable SEI passivation film, it may be understood that the high-rate discharge capacity was significantly degraded in comparison to those of the secondary batteries prepared in Examples 1 to 7.

In this case, the results of 2C discharge capacity evaluation of the secondary batteries of Examples 2 to 7 and 10 and the secondary batteries of Comparative Examples 3, 5, and 6, which had the same positive electrode loading capacity of 5 mAh/cm², are illustrated in FIG. 1. Referring to FIG. 1, it may be understood that the discharge capacities after the 2 C discharge of the secondary batteries prepared in Examples 2 to 7 and 10 were significantly increased in comparison to those of the secondary batteries prepared in Comparative Examples 3, 5, and 6.

Experimental Example 3. Evaluation of Capacity Retention after High-Temperature Storage After each of the secondary batteries prepared in Examples 1 to 6, 8, and 9 and Comparative Examples 1 to 9 was subjected to a formation process at a rate of 0.1 C for 3 hours at 25° C., each secondary battery was charged at a rate of 0.33 C to 4.25 V under a CC-CV condition at 25° C. and discharged at a rate of 0.33 C to 2.5 V under a CC condition. The above charging and discharging were set as one cycle, and 3 cycles of initial charging and discharging were performed.

Subsequently, after the secondary battery was charged at a rate of 0.33 C to 4.25 V under a CC-CV condition, stored at 60° C. for 6 weeks ((SOC; state of charge) of 100%), and then discharged at a rate of 0.33 C to 2.5 V under a CC condition, capacity retention was measured.

Capacity retention after high-temperature (60° C.) storage was evaluated by using the following Equation 1, and the results thereof are presented in Table 1 below.

Capacity retention after high-temperature storage= (discharge capacity after 6 weeks/discharge capacity before high-temperature storage)×100 [Equation 1]

Experimental Example 4. Evaluation of Resistance Increase Rate after High-Temperature Storage After each of the secondary batteries prepared in Examples 1 to 6 and 8 to 10 and Comparative Examples 1 to 9 was subjected to a formation process at a rate of 0.1 C for 3 hours at 25° C., each secondary battery was charged at a rate of 0.33 C to 4.25 V under a CC-CV condition at 25° C. and discharged at a rate of 0.33 C to 2.5 V under a CC condition. The above charging and discharging were set as one cycle, and 3 cycles of initial charging and discharging were performed. An initial voltage was measured using PNE-0506 charge/discharge equipment (manufacturer: PNE SOLUTION Co., Ltd., 5 V, 6 A), and a resistance value was calculated therefrom.

Subsequently, after the initially charged and discharged lithium secondary battery was charged at a rate of 0.33 C to 4.25 V under a CC-CV condition and stored at 60° C. for 6 weeks ((SOC; state of charge) of 100%), a voltage after high-temperature storage was measured while being again discharged at 2.5 C for 10 seconds at a SOC of 50%. The voltage was measured using the PNE-0506 charge/discharge equipment (manufacturer: PNE SOLUTION Co., Ltd., 5 V, 6 A). A resistance value was calculated from the voltage after high-temperature storage.

The initial resistance value and resistance value after high-temperature storage measured as described above were substituted into the following Equation (2) to measure a resistance increase rate, and the results thereof are presented in Table 1 below.

Resistance increase rate after high-temperature storage (%)=[(resistance value after 6 weeks of high-temperature storage/resistance value before high-temperature storage)×100]−100 [Equation 2]

Referring to the following Table 1, the secondary batteries prepared in Examples 1 to 6, 8, and 9 had a capacity retention (%) of 81% or more and a resistance increase rate (%) of 15% or less after storage at 60° C. for 6 weeks, wherein it may be understood that the capacity retentions and the resistance increase rates after storage at 60° C. for 6 weeks were improved in comparison to those of the secondary batteries prepared in Comparative Examples 1 to 9.

In this case, with respect to the secondary battery prepared in Example 10 in which the content ratio of the cyclic carbonate-based solvent was high, since the electrolyte wettability was decreased due to the increase in the viscosity of the electrolyte, it may be understood that the resistance increase rate after storage was increased to 18% in comparison to the secondary batteries prepared in Examples 1 to 6 and 8.

With respect to the secondary battery prepared in Comparative Example 7 which only included dimethyl carbonate as the electrolyte solution solvent, since it was difficult to form a stable SEI passivation film, it may be understood that the capacity retention (%) after storage at 60° C. for 6 weeks was 76%, which was decreased in comparison to those of the secondary batteries prepared in Examples 1 to 6, 8, and 9, and the resistance increase rate (%) was increased to 16%.

Experimental Example 5. High-Temperature Cycle Life Characteristics Evaluation

After each of the secondary batteries prepared in Examples 1 to 6 and 8 to 10 and Comparative Examples 1 to 9 was subjected to a formation process at a rate of 0.1 C for 3 hours at 25° C., each secondary battery was charged at a rate of 0.33 C to 4.25 V under a constant current-constant voltage (CC-CV) condition at 25° C. and discharged at a rate of 0.33 C to 2.5 V under a CC condition. The above charging and discharging were set as one cycle, and 3 cycles of initial charging and discharging were performed.

Subsequently, each of the initially charged and discharged lithium secondary batteries was charged at a rate of 0.33 C to 4.25 V under a CC-CV condition at a high temperature (45° C.) and discharged at a rate of 0.1 C to 2.5 V under a CC condition. The above charging and discharging were set as one cycle, and 150 cycles were performed.

Capacity after the first cycle and capacity after a 150th cycle were substituted into the following Equation 3 to calculate capacity retention. The results thereof are presented in Table 1 below.

(45° C.) were improved in comparison to those of the secondary batteries prepared in Comparative Examples 1 to 9.

In this case, with respect to the secondary battery prepared in Example 10, since the amount of the cyclic carbonate solvent (EC) was larger than that of the secondary battery prepared in Example 9, the EC prevented a side reaction between the electrolyte solution and the electrode while reforming the SEI lost during charge and discharge, and thus, it may be understood that the capacity retention (%) after 150 cycles at a high temperature (45° C.) was improved in comparison to that of the secondary battery prepared in Example 9.

With respect to the secondary battery prepared in Comparative Example 7 which only included dimethyl carbonate as the electrolyte solution solvent, since it was difficult to form a stable SEI passivation film, it may be understood that the capacity retention (%) after 150 cycles at a high temperature (45° C.) was degraded in comparison to those of the secondary batteries prepared in Examples 1 to 6, 8, and 9.

TABLE 1

| | Positive electrode Loading capacity (mAh/cm$^2$) | Non-aqueous electrolyte solution composition | | | Additive Amount of | | | 2 C | H.T. stor. charac. (6 wks) | | H.T. life charac. |
|---|---|---|---|---|---|---|---|---|---|---|---|
| | | Lithium salt | | Organic solvent | Amount added (g) | Formula in added (g) | −10° C. DCIR (mohm) | discharge capacity (%) | Capacity retention (%) | Resistance increase rate (%) | Capacity retention (%) |
| | | LiPF$_6$ (M) | LiFSI (M) | Type (volume ratio) | | | | | | | |
| Example 1 | 4 | 2 | — | EC/DMC = 1:9 | 99.9 | 0.1 | 300 | 81 | 87 | 9 | 91 |
| Example 2 | 5 | 2 | — | EC/DMC = 1:9 | 99.5 | 0.5 | 320 | 81 | 86 | 10 | 90 |
| Example 3 | 5 | 1 | 1 | EC/DMC = 1:9 | 99.5 | 0.5 | 290 | 82 | 89 | 8 | 92 |
| Example 4 | 5 | 2 | — | EC/DMC = 1:9 | 99 | 1.0 | 367 | 80 | 84 | 11 | 85 |
| Example 5 | 5 | 2.5 | — | EC/DMC = 1:9 | 99.5 | 0.5 | 400 | 81 | 85 | 14 | 88 |
| Example 6 | 5 | 2.5 | — | EC/DMC = 1:9 | 97 | 3 | 408 | 80 | 81 | 14 | 86 |
| Example 7 | 5 | 3 | — | EC/DMC = 1:9 | 99.5 | 0.5 | — | 81 | — | — | — |
| Example 8 | 6 | 2 | — | EC/DMC = 1:9 | 99.5 | 0.5 | 380 | 79 | 90 | 7 | 92 |
| Example 9 | 5 | 2 | — | EC/DMC = 1:9 | 95 | 5 | — | — | 82 | 15 | 83 |
| Example 10 | 5 | 2 | — | EC/DMC = 2:8 | 99.5 | 0.5 | 330 | 79 | — | 18 | 84 |
| Comparative Example 1 | 3 | 2 | — | EC/DMC = 1:9 | 99.5 | 0.5 | 412 | 78 | 79 | 17 | 82 |
| Comparative Example 2 | 3 | 0.7 | 0.5 | EC/DMC = 3:7 | 100 | — | 420 | 67 | 77 | 15 | 81 |
| Comparative Example 3 | 5 | 0.7 | 0.5 | EC/DMC = 3:7 | 100 | — | 416 | 31 | 72 | 17 | 80 |
| Comparative Example 4 | 6 | 0.7 | 0.5 | EC/DMC = 3:7 | 100 | — | 413 | 18 | 68 | 25 | 78 |
| Comparative Example 5 | 5 | 2 | — | EC/DMC = 1:9 | 100 | — | 503 | 70 | 72 | 20 | 65 |
| Comparative Example 6 | 5 | 1 | — | EC/DMC = 1:9 | 99.5 | 0.5 | 415 | 37 | 69 | 21 | 79 |
| Comparative Example 7 | 5 | 2 | — | DMC | 99.5 | 0.5 | 411 | 68 | 76 | 16 | 77 |
| Comparative Example 8 | 11 | 2 | — | EC/DMC = 1:9 | 99.5 | 0.5 | 671 | 25 | 58 | 31 | 62 |
| Comparative Example 9 | 5 | 2 | — | EC/DMC = 1:9 | 94 | 6 | 429 | 73 | 78 | 20 | 77 |

Capacity retention (%)=(discharge capacity after the 150th cycle/discharge capacity after the first cycle)×100    [Equation 3]

Referring to the following Table 1, the secondary batteries prepared in Examples 1 to 6 and 8 to 10 had a capacity retention (%) after 150 cycles at a high temperature (45° C.) of 83% or more, wherein it may be understood that the capacity retentions after 150 cycles at a high temperature The above descriptions are merely exemplary embodiments for preparing the secondary battery according to the present invention, so that the present invention is not limited thereto. The true scope of the present invention should be defined to the extent that those skilled in the art can make various modifications and changes thereto without departing from the scope of the invention, as defined by the appended claims.

The invention claimed is:

1. A lithium secondary battery comprising:
a positive electrode including a positive electrode material mixture layer formed on a positive electrode collector, wherein the positive electrode material mixture layer has a loading capacity of 3.7 mAh/cm$^2$ to 10 mAh/cm$^2$;
a negative electrode including a negative electrode material mixture layer formed on a negative electrode collector;
a separator disposed between the positive electrode and the negative electrode; and
a non-aqueous electrolyte solution including a lithium salt, an organic solvent, and a compound represented by Formula 1,
a concentration of lithium salt in the non-aqueous solution is 1.5 M to 3 M,
wherein the organic solvent is a mixed solvent including a cyclic carbonate-based organic solvent and a linear carbonate-based organic solvent, and
wherein the compound represented by Formula 1 is present in an amount of 0.1 wt % to 5 wt % based on a total weight of the non-aqueous electrolyte solution:

[Formula 1]

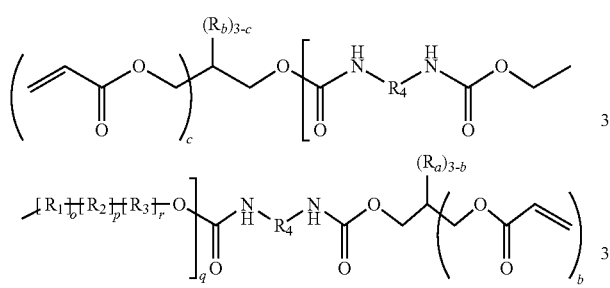

wherein, in Formula 1,
$R_1$ is an alkylene group having 1 to 5 carbon atoms which is unsubstituted or substituted with fluorine, or —$R_1'$—O—, wherein $R_1'$ is an alkylene group having 1 to 5 carbon atoms which is unsubstituted or substituted with fluorine,
$R_2$ is an alkylene group having 1 to 3 carbon atoms which is unsubstituted or substituted with fluorine, or —$R_2'$—O—, wherein $R_2'$ is an alkylene group having 1 to 3 carbon atoms which is unsubstituted or substituted with fluorine,
$R_3$ is an alkylene group having 1 to 5 carbon atoms which is unsubstituted or substituted with fluorine, $R_4$ is an aliphatic hydrocarbon group or an aromatic hydrocarbon group,
$R_a$ and $R_b$ are each independently hydrogen or an alkyl group having 1 to 3 carbon atoms,
o, p, q, and r are the numbers of repeating units,
is an integer of 1 to 5,
p is an integer of 1 to 10,
r is an integer of 1 to 5,
q is an integer of 4-2 to 15, and
b and c are each independently an integer of 1 to 3.

2. The lithium secondary battery of claim 1, wherein the positive electrode material mixture layer has a loading capacity of 4 mAh/cm$^2$ to 8 mAh/cm$^2$.

3. The lithium secondary battery of claim 1, wherein the positive electrode material mixture layer has a loading capacity of 4 mAh/cm$^2$ to 6 mAh/cm$^2$.

4. The lithium secondary battery of claim 1, wherein the concentration of the lithium salt in the non-aqueous solution is 2 M to 2.5 M.

5. The lithium secondary battery of claim 1, wherein the cyclic carbonate-based organic solvent and the linear carbonate-based organic solvent are present in a volume ratio of 0.5:9.5 to 2:8.

6. The lithium secondary battery of claim 1, wherein, in Formula 1, $R_1$ is —$R_1'$—O—, wherein $R_1'$ is an alkylene group having 1 to 5 carbon atoms which is substituted with fluorine, $R_2$ is —$R_2'$—O—, wherein $R_2'$ is an alkylene group having 1 to 3 carbon atoms which is substituted with fluorine, and $R_3$ is an alkylene group having 1 to 3 carbon atoms which is unsubstituted or substituted with fluorine.

7. The lithium secondary battery of claim 1, wherein the compound represented by Formula 1 comprises a compound represented by Formula 1a:

[Formula 1a]

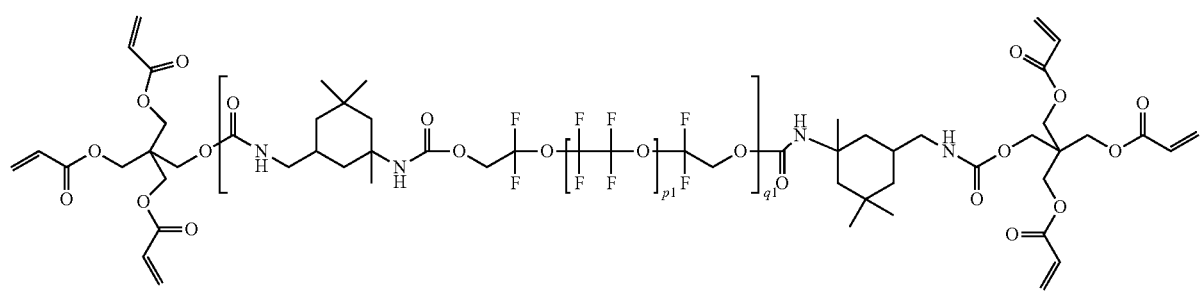

wherein, in Formula 1a,
p1 and q1 are the numbers of repeating units,
p1 is an integer of 1 to 10, and
q1 is an integer of 2 to 5.

8. The lithium secondary battery of claim 1, wherein the compound represented by Formula 1 is present in an amount of 0.1 wt % to 3 wt % based on the total weight of the non-aqueous electrolyte solution.

9. The lithium secondary battery of claim 1, wherein the compound represented by Formula 1 is present in an amount of 0.1 wt % to 1 wt % based on the total weight of the non-aqueous electrolyte solution.

10. The lithium secondary battery of claim 1, wherein the lithium secondary battery has a capacity retention of 82% or more after the lithium secondary battery is charged at a rate of 0.33 C to 4.25 V under a constant current-constant voltage (CC-CV) condition, stored at 60° C. for 6 weeks, and discharged at a rate of 0.33 C to 2.5 V under a constant current (CC) condition.

11. The lithium secondary battery of claim 1, wherein the lithium secondary battery has a capacity retention of 83% or more when measured after 150 cycles are performed, wherein, in one cycle, charging is at a rate of 0.33 C to 4.25 V under a constant current-constant voltage (CC-CV) condition at a temperature of 45° C. and discharging is at a rate of 0.1 C to 2.5 V under a constant current (CC) condition.

* * * * *

UNITED STATES PATENT AND TRADEMARK OFFICE
CERTIFICATE OF CORRECTION

| | |
|---|---|
| PATENT NO. | : 11,600,860 B2 |
| APPLICATION NO. | : 16/767424 |
| DATED | : March 7, 2023 |
| INVENTOR(S) | : Gwang Yeon Kim et al. |

It is certified that error appears in the above-identified patent and that said Letters Patent is hereby corrected as shown below:

On the Title Page

(72) Inventors: Change "Chui Haeng Lee" to --Chul Haeng Lee--

Signed and Sealed this
Eighteenth Day of April, 2023

Katherine Kelly Vidal
*Director of the United States Patent and Trademark Office*